United States Patent
Trulson et al.

[11] Patent Number: 5,038,615
[45] Date of Patent: Aug. 13, 1991

[54] ULTRASONIC MULTILAYER PAINT THICKNESS MEASUREMENT

[75] Inventors: Frederick J. Trulson, Detroit; August F. Scarpelli, Warren; George L. Sarosy, Utica, all of Mich.

[73] Assignee: General Motors Corporation, Detroit, Mich.

[21] Appl. No.: 521,875

[22] Filed: May 11, 1990

[51] Int. Cl.⁵ ............................................. G01B 17/02
[52] U.S. Cl. ........................................ 73/597; 73/602; 73/620; 73/627; 367/100
[58] Field of Search ................. 73/597, 602, 620, 627, 73/629, 642, 631, 598; 367/100

[56] References Cited

U.S. PATENT DOCUMENTS

| | | | |
|---|---|---|---|
| 3,934,458 | 1/1976 | Beretsky et al. | 73/602 |
| 4,541,279 | 9/1985 | Schomberg | 73/602 |
| 4,862,747 | 9/1989 | Boudy et al. | 73/631 |

FOREIGN PATENT DOCUMENTS 3435989  4/1986  Fed. Rep. of Germany ........ 73/627

OTHER PUBLICATIONS

Panametrics Corporation, *Thickness of Paint on Plastic*, NDT Applications, No. 19, Sep. 1988.
Panametrics Corporation, *High Frequency Ultrasonic Thickness Gaging Equipment, Techniques, and Applications*, NDT Technical Publications, No. 3, Mar. 1988.

Primary Examiner—Hezron E. Williams
Assistant Examiner—Rose M. Finley
Attorney, Agent, or Firm—Robert M. Sigler

[57] ABSTRACT

Ultrasonic thickness measurement of layers of paint on a substrate produces pulse echoes indicative of each layer interface. Several ultrasonic waveforms are averaged in a digital oscilloscope and the resultant waveform is analyzed by a computer programmed to recognize wave forms resembling pulse echoes, compare such waveforms to stored reference waveform characteristics, and selecting the waveform having the best fit to the reference. Each selected pulse echo is graded based on amplitude, peak separation, peak symmetry, and spacing from a previous echo to determine the quality of the waveform. Layer thickness is calculated from the spacing between pulse echoes and the velocity of sound in the layer material.

22 Claims, 4 Drawing Sheets

ULTRASONIC MULTILAYER PAINT THICKNESS MEASUREMENT

FIELD OF THE INVENTION

This invention relates to the ultrasonic measurement of thin layers and particularly to a method of waveform analysis for measuring individual layers in a multilayer laminate.

BACKGROUND OF THE INVENTION

A typical finished vehicle body will have three layers of paint coatings: clear, color and prime. For best quality and process control, it is desirable to measure each layer. Traditional measuring instruments used in vehicle manufacturing facilities are based on a magnetic principle and determine the total thickness of paint on a steel substrate. This is not applicable to plastic substrates which are becoming increasingly important in automotive fabrication. Moreover, only the total thickness is measured rather than the individual layers. To make layer measurements on plastic automotive panels it has been necessary to fasten steel coupons to a plastic buck representing a body, painting the buck and removing the coupons after each layer of paint to measure the paint thickness increment by the magnetic method. This method is very slow and expensive, and, as a practical matter, can not be used very often.

It is known that ultrasonic measurement can reveal thicknesses of materials by transmitting a high frequency sound pulse through the material, receiving the echo pulses reflected from the surface and subsequent interface layers of the material, measuring the time between pulses, and multiplying half the time by the velocity of sound in the material. This principle has been applied to measuring multiple layers of plastic having thickness in the range of 0.001 to 0.005 inch as described in the Panametrics brochure, "NDT Applications" No. 3, February 1986. There, a 50 or 100 MHz transducer is used with a short delay line coupling the transducer to the material surface. Received waveforms are displayed on an oscilloscope and are visually inspected to identify the echoes and measure the time separation of pulses. In addition, this method has been applied to the measurement of mulitples layers of paint in a vehicle manufacturing environment, with an average of several repeated waveforms displayed on an oscilloscope and visually compared by a trained operator to predetermined sample data for identification of pulse echoes and measurement, on the oscilloscope screen, of pulse echo delays. This practice requires a good instinct for interpreting waveforms and repeated accurate measurement by a human operator. To reduce the chance of error and obtain more consistently accurate measurements, a method of automatically interpreting the waveform and making the measurement is desirable.

SUMMARY OF THE INVENTION

It is therefore an object of the invention to provide a method for automatically analyzing pulse echo waveforms reflected from the interfaces of multilayer paint or other laminates to determine the thicknesses of individual layers.

The invention is carried out in a system for measuring layer thicknesses of multiple thin layers by transmitting ultrasonic pulses through the layers and receiving pulse echo waveforms reflected from the layer interfaces by the method of analyzing the pulse echo waveforms comprising the steps of: deriving from the pulse echo waveforms an enhanced waveform revealing characteristic M-shaped and W-shaped pulse echo forms, storing the enhanced waveform as digital data, defining characteristic reference patterns, determining zones in the enhanced waveform corresponding to the predicted positions of the pulse echoes, locating candidate pulse shapes in the zones, comparing candidate pulse shapes in a first zone of the enhanced waveform to a characteristic reference pattern to select the pulse shape having the best fit to the pattern, whereby the position of the selected pulse shape in the enhanced waveform corresponds to one interface position, repeating the locating and the comparing steps for at least another zone corresponding to the position of another interface to determine at least another interface position, and determining layer thickness based on the separation of the selected pulses in adjacent zones.

The above and other advantages of the invention will become more apparent from the following description taken in conjunction with the accompanying drawings.

DESCRIPTION OF THE PREFERRED EMBODIMENT

The ensuing description is directed to a process developed for ultrasonically measuring paint layer thicknesses applied to automotive panels of either plastic or steel material. The process is applicable to other layered products and is not limited to automotive paint measurement.

Figure 1:
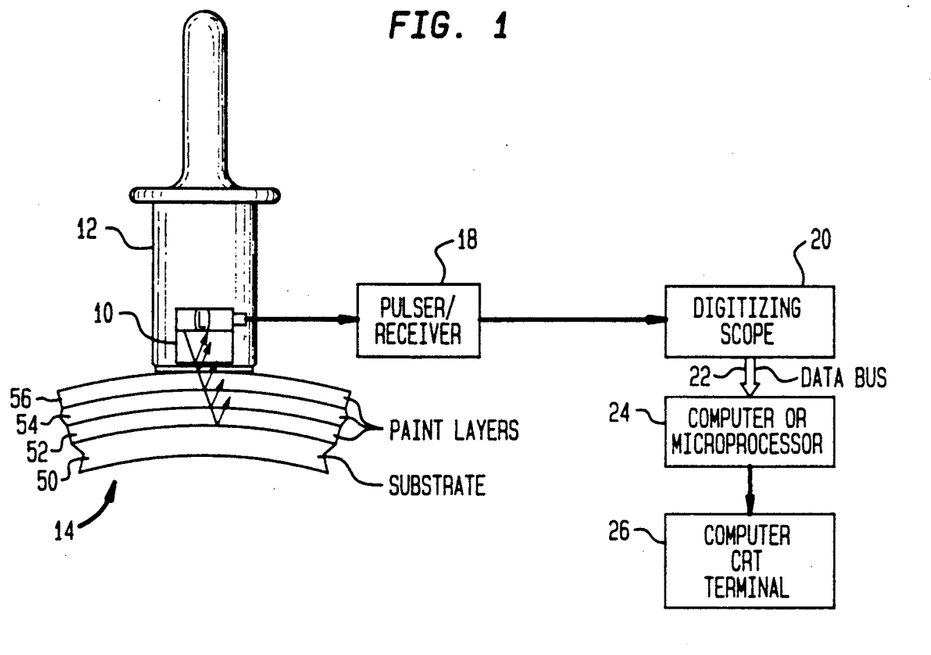
FIG. 1 is a system diagram for ultrasonic measurement of layers of paint on a substrate according to the invention.
Figure 2:
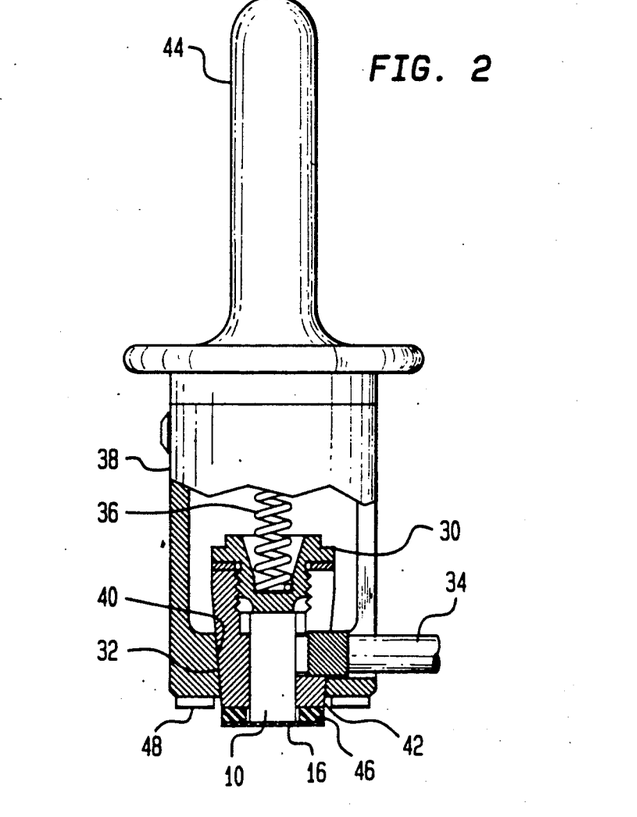
FIG. 2 is a partly broken away view of a measuring probe used in the system of FIG. 1.

As shown in FIG. 1, a transducer 10 in a holder 12 is coupled to a painted panel 14 to transmit ultrasonic pulses through paint layers separated by layer interfaces and receive echo pulses reflected from the layer interfaces. As seen in FIG. 2, shim 16 couples the ultrasonic pulses and echo pulses between transducer 10 and panel 14 and also serves as a delay line to separate an unwanted signal from the echo. The transducer 10 is connected to a pulser/receiver 18 which powers the transducer and transmits received echo pulses to a digitizing oscilloscope 20. The oscilloscope 20 has the capability to average several consecutive received waveforms and display the result as well as to store the data representing the digitized average. The data is sent over a bus 22 to a computer or microprocessor 24 which has a terminal 26. The transducer preferably operates at a frequency of 125 MHz or even higher, say, 200 MHz, for very thin layer measurement.

The transducer 10, as shown in FIG. 2, is held in a fixture 30 with a frustroconical lower end 32. An output cable 34 provides communication with the pulser/receiver 18. A cable length of 150 feet is used to separate pulse echoes from unwanted signals due to impedance mismatch of the cable and transducer. The fixture 30 is biased downward by a spring 36 within a case 38 against a matching conical internal surface 40 so as to project outward somewhat from an opening 42 in the bottom of the case 38. The case 38 also includes a handle 44. A Mylar (T) shim 16 is held against the lower face of the transducer 10 by a rubber ring 46 which also creates a chamber filled with a contact fluid such as glycerin. Three rubber pads 48 are secured to the lower end of the case 38 near the opening 42.

In use, an operator applies a film of water couplant to the paint, grasps the handle 44 and presses the transducer 10 substantially normally against the painted surface to be tested until the pads 48 are flat against the painted surface. The fixture 30 with transducer 10 is thus pushed slightly axially inward, which frees the conical surfaces and allows transducer 10 to adjust itself as necessary against the painted surface for good contact with a predetermined force controlled by spring 36 regardless of variations in force or orientation of the case 38 produced by the operator. The arrangement provides for straight alignment of transducer 10 before use and automatic surface alignment and force control during use. The panel 14 is flat or convex in order to make good contact with the transducer 10.

The panel 14 comprises a plastic or steel substrate 50 painted with a prime coat 52, a base or color coat 54 and a clear coat 56. In the case of a molded plastic substrate, sometimes a layer of in-mold coating is applied at the time of substrate manufacture. Due to differences in sound velocity in each layer or coat, an ultrasonic pulse is partially reflected from each interface including the interface between the shim 16 and the top paint surface. If, however, adjacent layers have nearly the same velocity, echo pulses will be very weak and sometimes not susceptible to recognition. For this reason the particular paint used for each layer affects the quality of echo signal. Since different color paints have different formulations, some colors yield better echoes from the clear/color interface than others. The prime coat is generally sufficiently different from the color coat to yield fairly distinct echoes from the color/prime interface. Similarly a plastic substrate surface usually produces an adequate echo while a very strong signal is reflected from a steel substrate. In the case where the clear/color interface echo is too weak for analysis, the total thickness of the clear and color coats is used instead of individual layers.

Figure 3:
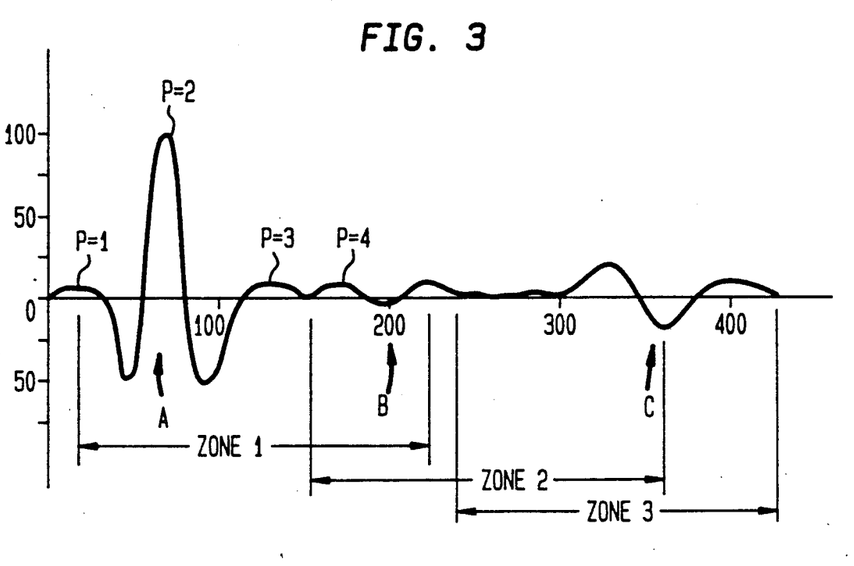
FIG. 3 is an ultrasonic pulse echo waveform produced in the system of FIG. 1.

FIG. 3 illustrates a typical signal waveform comprising the average of several waveforms which has been filtered to remove high frequency noise. Characteristic echo pulses have a center peak of one polarity and two side lobes of the opposite polarity and thus resemble a W-shape or an M-shape, depending on the polarity of the center peak. The characteristic shape is attained by adjusting the damping on the transducer circuit until the correct shape is generated. The center peak is the most readily identifiable point on the pulse. The beginning of the echo pulse which occurs prior to the center peak is the true representative of the interface but that point is obscure. Although the center peak is somewhat removed from the beginning, the separation of adjacent center peaks has been found to be a good measure of the layer thickness. Thus the object of the waveform analysis will be to identify the echo pulses and accurately determine each center peak location. In FIG. 3, the center peak of a W-shaped pulse lies at position A, while corresponding center peaks of M-shaped pulses are at positions B and C. The waveform is for the first two of three layers of paint on a plastic substrate. The peak at A corresponds to the top surface of the clear coat, the peak at B corresponds to the clear/color interface, and the peak at C is the color/prime interface. If desired the scan can be extended to locate the prime/substrate interface.

Figure 4:
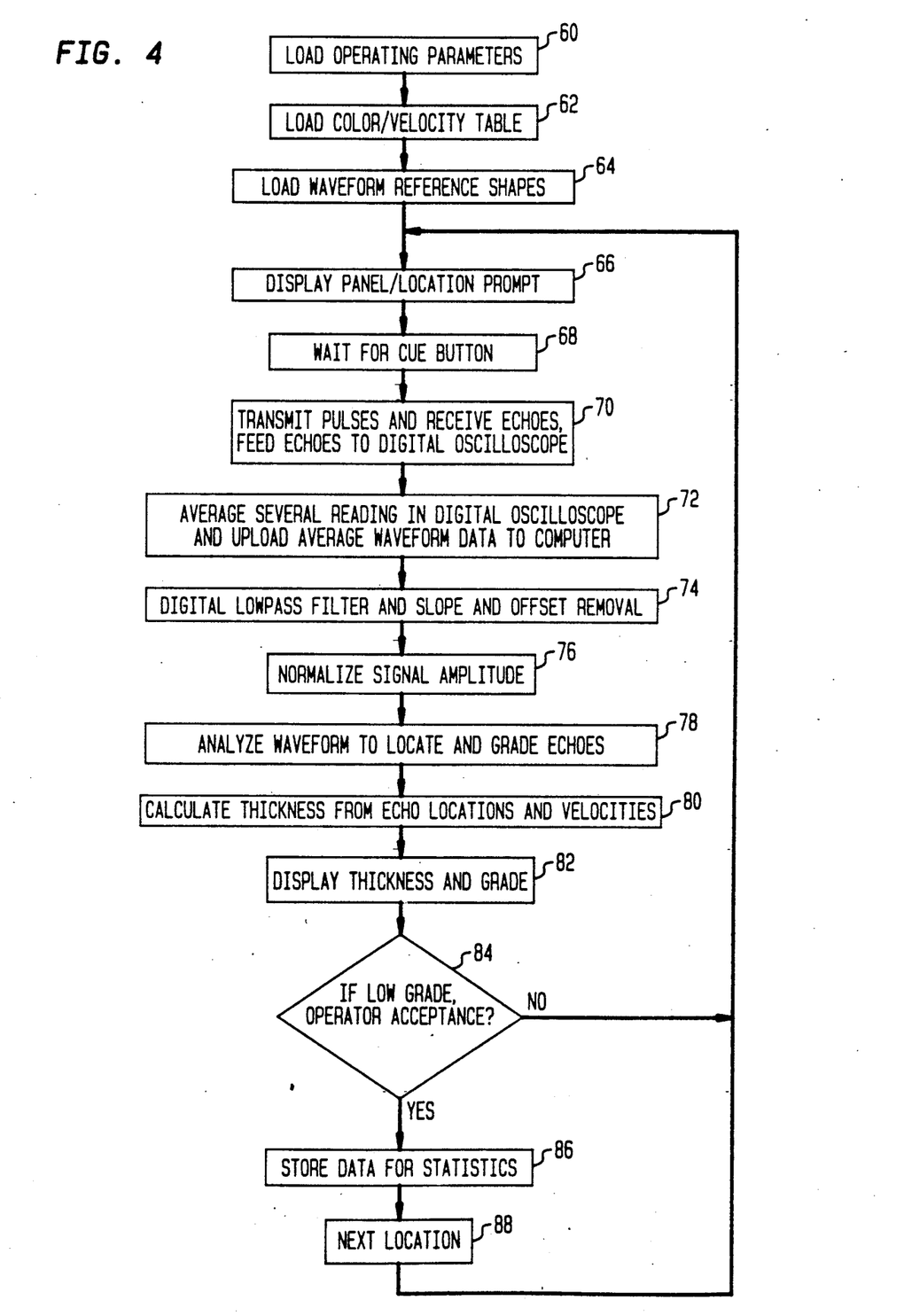
FIG. 4 is a flow chart illustrating the general method of the invention.
Figure 5:
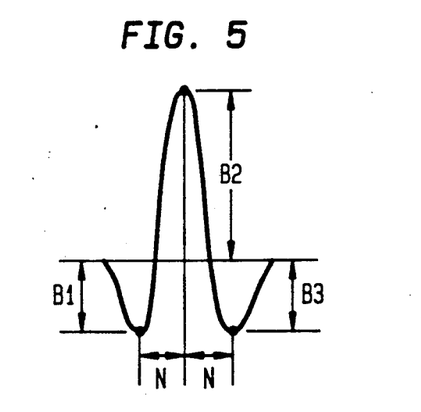
FIG. 5 is an illustration of a typical reference pulse waveform and the characterizing parameters.

The general method of determining layer thickness is described with reference to the flow chart of FIG. 4. In this and other flow charts, the functional explanation marked with numerals in angle brackets, <nn>, refers to blocks bearing that number. The computer is loaded with operating parameters <60> such as the number of pulses to look for, the search range for each pulse, etc. A color/velocity table is loaded <62> which lists the velocity for each paint layer and waveform reference shapes are loaded <64>. A typical reference shape is shown in FIG. 5 and is characterized by four values. The three peaks have signed amplitudes B1, B2, and B3 and the peak separation between the side peaks and the center peak is N. The ideal waveform for each pulse is empirically determined for each color paint and is characterized by the pulse amplitudes, polarities, and the separation of the side peaks from the center peak. Thus the ideal for the first pulse in FIG. 3 may be 20, −48, 100, −52, where 20 is the peak separation N and the following numbers are the peak amplitudes for a waveform normalized to 100 for the highest peak. The computer displays the location of the desired test point on the vehicle <66> and waits for the cue button <68>. The operator must then position the transducer on the panel at the indicated location and trigger the cue button. The pulser/receiver 18 continually sends ultrasonic pulses, receives the reflected echoes and sends the echoes to the oscilloscope 20 <70>. Upon receipt of the cue, the oscilloscope is activated to receive the echoes. The oscilloscope averages about five waveforms and sends the data for the average waveform to the computer 24 <72>. The waveform is represented by 512 data points. The computer low pass filters the data to remove high frequency noise and removes slope and offset which have been imposed by saturation of an amplifier <74>. The signal amplitude is normalized with the largest peak at 100 <76> and the waveform is analyzed to locate echo pulses, assess the quality of the waveform as a measure of confidence in the echo location and assign a grade to the quality of the waveform <78>. The thickness of each layer is calculated from the echo locations and the velocity for the layer <80>. The thickness of each layer is displayed along with the grade of the whole waveform <82>. If the grade is low, the operator has the option of accepting or rejecting the measurement <84>. If it is not accepted, the process is repeated from block 66, thus giving the operator the opportunity to adjust the transducer position and repeat the measurement. If the measurement is accepted <84>, the data is stored for statistics <86> and the next location is measured <88> by repeating the process from block 66.

Figure 6:
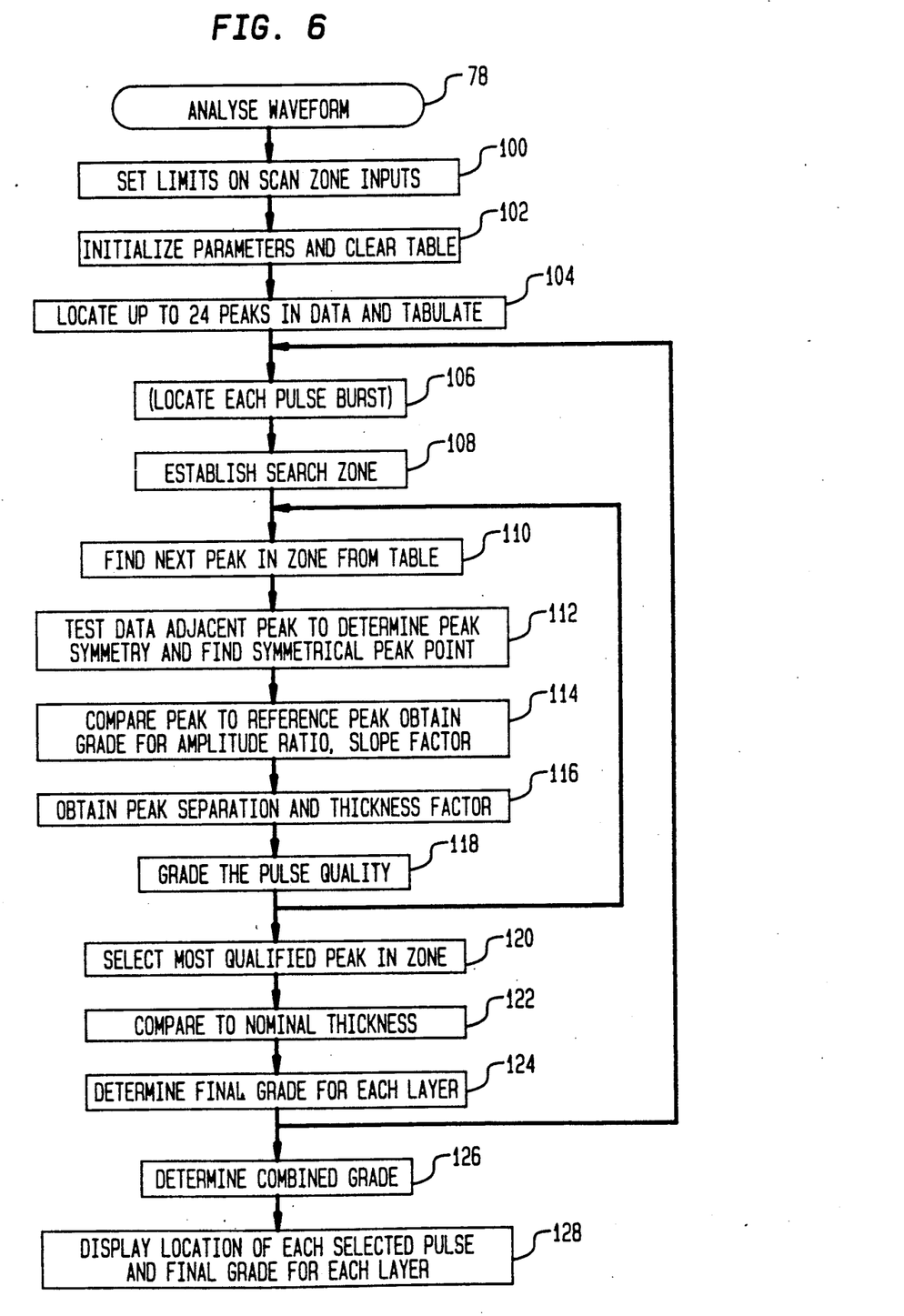
FIG. 6 is a flow chart illustrating the waveform analysis program for use in the method of FIG. 4, according to the invention.

The block 78 representing the computer program for analyzing the waveform is further set forth in the flow chart of FIG. 6. Since the paint layer thicknesses fall within certain known ranges, the position of the echo pulse from each interface will occur in a known zone or within a certain number of data positions from the previous pulse. Thus each echo pulse is identified by a search within a zone, and then the position of the next zone is calculated and a search is made there for the next pulse. The manually entered setup data from block 60 includes information on these scan zones; this data is checked by the program to verify that it falls within preset limits <100>. A default value is used for any out-of-limit data. Next, program parameters are initialized and a table for storing peak data is cleared <102>. To prepare for the pulse searches, the peaks in the waveform (up to 24) are located by finding their maxima and minima and their data positions are entered into the table <104>. Subsequent searching for peaks uses the tabulated peak positions.

A major loop in the program is entered for locating each pulse burst <106>. First the search zone is established <108>. The loop is repeated for each zone to be searched. In the example of FIG. 3, only three zones are searched to determine the thicknesses of the clear coat and the color coat. A four zone search would yield the prime coat thickness as well. For the first zone, the setup data gives the starting position and the zone size. The starting position is generally of the order of 20 data points from the beginning of the waveform and the zone size is about 200. Thus the search field is limited to the range of positions 20 to 220. The second field is defined based on the position of the first pulse, etc.

Next a local loop is entered to compare each candidate peak in the zone (up to four) to the reference waveform for that zone. The waveform reference shapes entered in block 64 gives for each pulse the peak separation and peak amplitudes of the ideal pulse. For example, the first pulse should have a strong positive center peak and negative side lobes, and is represented by 18, −50, 100, −45, where 18 is the separation between the center peak and each side lobe, 100 is the center peak, and −50 and −45 are the first and second side peaks. The second pulse reference waveform may be 19, 4, −10, 4 for example. The local loop begins by finding the next peak in the table which has the same sign as the center peak of the desired pulse shape <110>.

Figure 7:
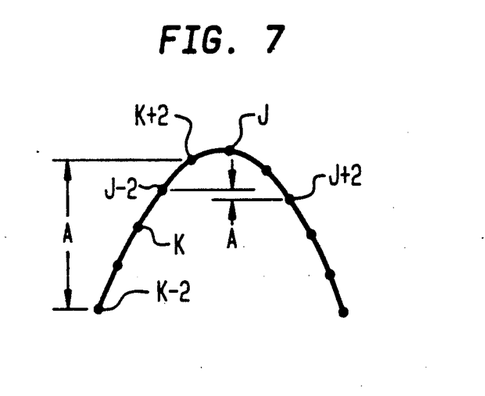
FIG. 7 is a waveform illustrating a symmetry checking method of FIG. 6.

Each candidate center peak and its side peaks are examined for symmetry and if it is not symmetrical, its symmetrical center, based on minimum slope, is substituted for the table value of the peak position <112>. The symmetry test is illustrated in FIG. 7. The peak slope is measured at three points on either side of the nominal peak position J. The measurement is made for position K, for example by determining the amplitude difference A between points K−2 and K+2. Slope is indicated by A/4 and the point having the minimum absolute value of A is taken as the peak center. In this illustration, position J yields the smallest value of A and thus is retained as the peak location.

Block 114 makes a comparison of the ratio R for the three peaks for each pulse and assigns a score to the fit where a perfect fit yields a score of zero. In block 114 the peak amplitude D is compared to the reference amplitude B to determine the fit in that respect. The comparison is based on a function of the difference of amplitudes divided by the sum of the amplitudes, or $R = ABS(D-B/D+B).$ A ratio of zero indicates equal amplitude while a larger ratio reveals the degree of misfit. Peak symmetry is measured by a slope factor SF, which is also determined from the minimum slope A/4 from FIG. 7 and from the reference amplitude B and the half cycle period or peak separation N such that $SF = ABS(A/4)(B/N).$ A slope factor of zero indicates the slope at the located peak is zero and the peak is symmetrical. The slope factors and ratios of the three peaks are accumulated for each pulse to render composite SF and R scores for the pulse waveform.

Block 116 determines the peak separation PS factor and thickness factor TF for each waveform. The positions of the first and second peaks of a pulse determine the peak separation Z. A peak separation factor is calculated by $PS = ABS(Z-N)/N,$ where N is the reference value of separation. The thickness factor TF is not calculated for the first zone since layer thickness can not be known until the second zone measurement. There, the separation of the candidate center peak from the center peak of the last measured pulse is compared to the expected range of thickness of the layer as loaded in block 64. As shown by the function in FIG. 8, if the center peak falls in the center C of the range, the thickness factor TF is zero and it gradually increases to 0.5 at the limits X1, X2 of the range and continues linearly beyond the limits to a value of one. Thus TF is a measure of the proximity of the center peak to its expected position.

The score or grade G for each candidate pulse is calculated <118> by combining the factors R, SF, TF, and PS as well as a weighting factor W=P−1 which favors the pulse nearest the beginning of the zone, where P is the pulse number beginning at 1 in each zone as shown in FIG. 3. Due to zone overlap, Peak number 4 of zone 1 becomes peak number 1 of zone 2. The score is given by the following equation:

$G = [(P-1)*0.2 + R/5 + SF/6*0.1 + PS*0.66 + TF]/2.45.$

This score is normalized to have a maximum value of 1 and a mimimum value of zero. After the score for a pulse candidate is calculated, the inner loop is repeated by returning to block 106 until no more center peaks of the proper sign are left in the zone or four peaks have been examined. Then the most qualified peak in the zone is selected <120> on the basis of the scores. The score is zero for a perfect case so accordingly the candidate pulse with the lowest score or grade is selected.

Figure 8:
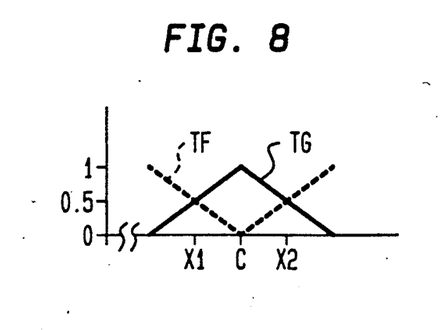
FIG. 8 is an illustration of a thickness weighting function used in the program of FIG. 5.

In order to determine a Final Grade FG or figure of merit for each selected pulse, it is first necessary to again compare the measured thickness to the nominal thickness <122>. The Thickness Grade TG as shown in FIG. 8 is inverted from the TF function and has a value of 1 at the center C of the range and a value of 0.5 at the limits X1 and X2 and continues linearly beyond the limits to a zero value. Then the final grade FG for the layer is calculated <124> by calculating Quality Grade=1−G/(G+1), where G is the grade of the selected pulse, Ratio Grade=1−R, Slope Grade=1−SF/(SF+1), Separation Grade=1−PS, and selecting the smallest value of any of Thickness, Ratio, Slope, and Separation Grades as the Final Grade for the layer.

When each layer has been graded, the major loop repeats by returning to block 106 to repeat the pulse selection process for the next zone. The beginning of the next zone is determined by adding a sufficient value to the last selected center peak position to avoid scanning the side lobes of the previous pulse. When the desired number of paint interfaces has been measured, a Combined Grade for the whole waveform is determined <126>. The Combined Grade is the lowest of the Final Grades for the several layers. Thus if every grade in all the layers is high except one, the one low grade becomes the Combined Grade for the entire waveform.

Before returning to the main program, the location of each selected peak is displayed along with the Final Grade for each layer as a measure of confidence in each echo location <128>.

The method is successful in gauging automotive paint whether two coats or three coats are measured. The success is due to the speed, the accuracy, and the economy of use. The method is preferably applied to a finished vehicle after being baked, although it can be used after any coat of paint is applied and cured. It is nondestructive and offers only a short delay in final processing of the vehicle. Many test points per vehicle can be measured since each point takes only about 10 seconds per measurement. Thicknesses down to 1.0 mil can be measured with an accuracy of better than 0.2 mils using a 125 MHz transducer. A higher frequency transducer, say, 200 MHz will reduce the minimum thickness and improve the accuracy. The system is useful with metal substrates as well as plastic such as SMC, polyurethane, and nylon.

The embodiments of the invention in which an exclusive property of privilege is claimed are defined as follows:

1. A method for measuring layer thicknesses of multiple thin layers separated by layer interfaces comprising the steps:
   transmitting ultrasonic pulses through the layers,
   receiving echo pulses reflected from the layer interfaces,
   deriving from the echo pulses a signal waveform revealing characteristic M-shaped and W-shaped echo pulse shapes and storing the signal waveform as digital data,
   defining characteristic reference shapes,
   determining zones in the signal waveform corresponding to predicted positions of the layer interfaces,
   locating candidate echo pulse shapes in one of the zones,
   grading the candidate echo pulse shapes by comparing the candidate echo pulse shapes to one of the reference shapes and assigning a score to each of the candidate echo pulse shapes based on its fit to the one of the reference shapes,
   selecting one of the candidate echo pulse shapes having the best score and storing a position thereof in the signal waveform corresponding to the location of one of the layer interfaces,
   repeating the locating, grading and selecting steps for at least another zone to select another candidate echo pulse shape and store a position thereof in the signal waveform corresponding to the location of another of the layer interfaces, and
   determining layer thickness form the stored positions of the selected candidate echo pulse shapes in adjacent zones.

2. The invention as defined in claim 1 wherein the reference shape is defined by peak amplitudes and spacing of adjacent peaks and each grading step includes comparing the fit of each of the candidate echo pulse shapes to the amplitudes and spacing of the one of the reference shapes.

3. The invention as defined in claim 1 wherein each of the candidate echo pulse shapes comprises three peaks, the reference shape defines reference amplitudes for each of the three peaks and a reference spacing between adjacent peaks, and each grading step includes grading the fit of each peak in each of the candidate pulse shapes to the corresponding reference amplitude and a representative spacing of the peaks in each of the candidate echo pulse shapes to the reference spacing and combining the resulting grades.

4. The invention as defined in claim 3 wherein each grading step comprises calculating a peak fit value for each of the three peaks equal to the absolute value of the difference between the amplitude of a peak and its corresponding reference amplitude divided by the sum of the amplitude of the peak and the corresponding reference amplitudes and accumulating the calculated peak fit values.

5. The invention as defined in claim 3 wherein each grading step comprises calculating a composite peak amplitude score based on the difference between the amplitude of each peak and its corresponding reference value, a composite symmetry factor SF based on the symmetry of each peak, a peak separation factor PS based on the separation of the first two of the three peaks and a thickness factor TF based on the difference between the position of at least one of the peaks and a predicted position thereof.

6. The invention as defined in claim 1 wherein the step of locating candidate pulse shapes in the signal waveform comprises the steps of searching for peaks in all zones of the signal waveform and tabulating the positions and amplitudes of the peaks, and the step of grading comprises selecting groups of tabulated peaks, finding the symmetrical center of the peaks using the digital data, and comparing each group of peaks to the one of the reference shapes for determining the best fit to the one of the reference shapes.

7. The invention as defined in claim 1 wherein the repeating step includes establishing the next zone beginning at a position beyond the position of the selected one of the candidate echo pulse shapes in the previous zone.

8. The invention as defined in claim 1 in which the selected candidate echo pulse comprises three peaks and the stored position thereof is the position of the central one of the peaks.

9. A method for measuring layer thicknesses of paint layers between layer interfaces in multilayer paint on a substrate comprising the steps:
   transmitting ultrasonic pulses through the paint layers,
   receiving echo pulses reflected from the layer interfaces,
   deriving from the echo pulses a signal waveform revealing characteristic M-shaped and W-shaped echo pulse shapes and storing the signal waveform as digital data, defining characteristic reference shapes, determining zones in the signal waveform corresponding to predicted positions of the layer interfaces, locating candidate echo pulse shapes in the one of the zones corresponding to the first of the layer interfaces, grading the candidate echo pulse shapes by comparing the candidate echo pulse shapes to one of the reference shapes and assigning a score to each of the candidate echo pulse shapes based on its fit to the one of the reference shapes, selecting one of the candidate echo pulse shapes having the best score and storing a position thereof in the signal waveform corresponding to the location of the first of the layer interfaces, repeating the locating, grading and selecting steps for at least another zone to select another candidate echo pulse shape and store a position thereof in the signal waveform corresponding to the location of another of the layer interfaces, and determining layer thickness from the positions of the selected echo pulse shapes in adjacent zones.

10. The invention as defined in claim 9 wherein each candidate echo pulse shape has three peaks and each reference shape defines reference peaks, and wherein the grading step includes:

finding a symmetrical center of each peak in each of the candidate echo pulse shapes and determining a slope and amplitude of each peak at its symmetrical center, comparing a separation of adjacent peaks in each of the candidate echo pulse shapes to a separation of corresponding reference peaks in the one of the reference shapes, comparing the slope and amplitude of each peak in each of the candidate echo pulse shapes to the slope and amplitude of a corresponding peak in the one of the reference shapes, assigning scores to the slopes, amplitudes and separations of the peaks in each of the candidate echo pulse shapes, and combining the scores to determine the score of each of the candidate echo pulse shapes.

11. The invention as defined in claim 9 wherein for zones other than the first zone the grading step further includes determining an expected position of each of the candidate echo pulse shapes in the zone in accordance with typical layer thickness and assigning a thickness score to each of the candidate echo pulse shapes according to its proximity to the expected position, and including the thickness score in the assigned score for each of the candidate echo pulse shapes.

12. The invention as defined in claim 10 wherein for each selected candidate echo pulse shape, a final grade is determined based on the scores for the slopes, the separation, and the amplitudes of the peaks, whereby the final grade is an indicator of selected pulse quality.

13. The invention as defined in claim 9 in which the selected candidate echo pulse comprises three peaks and the stored position thereof is the position of the central one of the peaks.

14. In apparatus for measuring layer thicknesses of multiple thin layers separated by layer interfaces, the apparatus having means for transmitting ultrasonic pulses through the layers and receiving echo pulses reflected from the layer interfaces, the improvement comprising, in combination:

means for deriving from the echo pulses a signal waveform revealing characteristic M-shaped and W-shaped pulse echo pulse shapes, and storing the signal waveform as digital data, means for defining characteristic reference shapes, means for determining zones in the signal waveform corresponding to predicted positions of the layer interfaces, means for locating candidate echo pulse shapes in the zones, means for grading the candidate echo pulse shapes by comparing the candidate echo pulse shapes to one of the reference shapes and assigning a score to each of the candidate echo pulse shapes based on its fit to the one of the reference shapes, means for selecting one of the candidate echo pulse shapes having the best score and storing a position thereof in the signal waveform corresponding to the location of one of the layer interfaces, and means for repeating the locating, grading and selecting steps for at least another zone to select another candidate echo pulse shape and store a position thereof in the signal waveform corresponding to the location of another of the layer interfaces, whereby the difference in the stored positions of the selected echo pulse shapes in adjacent zones indicates layer thickness.

15. The invention as defined in claim 14 wherein the reference shapes are defined by peak amplitudes and spacing of adjacent peaks and the grading means comprises means for comparing a fit of each of the candidate echo pulse shapes to the peak amplitudes and spacing of the one of the reference shapes.

16. The invention as defined in claim 14 wherein each candidate echo pulse shape comprises three peaks, the reference shape defines reference amplitudes for each of the three peaks and a reference spacing between adjacent peaks, and the grading means grades a fit of each peak in each candidate echo pulse shape to the corresponding reference amplitude and a representative spacing of the peaks in each candidate echo pulse shape to the reference spacing and combines the resulting grades.

17. The invention as defined in claim 16 wherein the grading means calculates a peak fit value for each of the three peaks equal to the absolute value of the difference between the amplitude of a peak and its corresponding reference amplitude divided by the sum of the amplitude of the peak and the corresponding reference amplitudes and accumulates the calculated peak fit values.

18. The invention as defined in claim 14 wherein the means for locating candidate echo pulse shapes in the signal waveform comprises means for searching for peaks in all zones of the signal waveform and tabulating the positions and amplitudes of the peaks and the grading means comprises means for selecting groups of tabulated peaks, means for finding the symmetrical center of the peaks using the digital data, and means for comparing each group of peaks to the reference shape for determining the best fit to the reference shape.

19. The invention as defined in claim 14 wherein the repeating means comprises means for establishing the next zone beginning at a position beyond the position of the selected echo pulse shape in the previous zone.

20. The invention as defined in claim 14 in which the selected candidate echo pulse comprises three peaks and the stored position thereof is the position of the central one of the peaks.

21. In apparatus for measuring layer thicknesses between layer interfaces of multilayer paint on a substrate by transmitting ultrasonic pulses through the paint layers and receiving echo pulses reflected from the layer interfaces, the improvement comprising, in combination:

means for deriving from the echo pulses a signal waveform revealing characteristic M-shaped and W-shaped echo pulse shapes and storing the signal waveform as digital data, means for defining characteristic reference shapes, means for determining zones in the signal waveform corresponding to the positions of the layer interfaces, means for locating candidate echo pulse shapes in the one of the zones corresponding to the first of the layer interfaces, means for grading the candidate echo pulse shapes by comparing the candidate echo pulse shapes to one of the reference shapes and assigning a score to each of the candidate echo pulse shapes based on its fit to the one of the reference shapes, means for selecting one of the candidate echo pulse shapes having the best score and storing a position thereof in the signal waveform corresponding to the location of one of the layer interfaces, means for repeating the locating, grading and selecting steps for at least another zone to select another candidate echo pulse shape and store a position thereof in the signal waveform corresponding to the location of another of the layer interfaces, whereby the difference in the stored positions of the selected echo pulse shapes in adjacent zones indicates layer thickness.

22. The invention as defined in claim 21 in which the selected candidate echo pulse comprises three peaks and the stored position thereof is the position of the central one of the peaks.

* * * * *